United States Patent Office 3,634,394
Patented Jan. 11, 1972

3,634,394
METHOD FOR THE PREPARATION OF NOVEL ION EXCHANGERS ON THE BASIS OF CELLULOSE
Bjorn Arild Andreassen, Dept. of Chemistry, University of Calgary, Calgary 44, Alberta, Canada
No Drawing. Filed Feb. 6, 1970, Ser. No. 9,429
Claims priority, application Sweden, Feb. 7, 1969, 1,647/69
Int. Cl. C08b *11/10, 11/14, 11/22*
U.S. Cl. 260—232
2 Claims

ABSTRACT OF THE DISCLOSURE

A method for the preparation of ion exchangers consisting of round grains of cellulose substituted by groups of the formula —$R_1Z$, wherein $R_1$ is a lower alkylene group containing 1–3 carbon atoms, said alkylene being optionally substituted by a hydroxyl group, and Z is a carboxylic, sulfo or phosphono group or salts thereof or an amino group of the formula

or a quaternized amino group of the formula

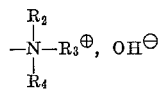

or salts thereof, where $R_2$, $R_3$ and $R_4$ each represent hydrogen or an optionally hydroxy-substituted lower alkyl group containing 1–4 carbon atoms, the degree of substitution corresponding to an ion exchange capacity in the range of from 0.2 to 1.8 milliequivalent per gram, preferably from 0.5 to 1.2 milliequivalents per gram of dry substance, the grains containing 2–25% of cellulose calculated as unsubstituted product in weight per volume, and having pores essentially lying in the range of from 2 to 2000 mµ is disclosed in which method the substituted cellulose is dissolved in an alkaline medium to a concentration of 1–15%, preferably 3–10%, calculated in weight per volume, and the resulting solution is emulsified to droplet form in a water-immiscible solvent, and the obtained emulsion is contacted with an acid reacting substance or a substance capable of forming an acid reacting substance in contact with the emulsion, in a quantity sufficient to neutralize the alkaline medium, so that the substituted cellulose is precipitated in the form of round pore grains of essentially the same size as the droplets.

The present invention relates to a method for the preparation of novel ion-exchangers on the basis of cellulose. More particularly, the invention concerns a method for the preparation of ion-exchangers consisting of grains of cellulose substituted by groups of the formula —$R_1$—Z, wherein $R_1$ is a lower alkylene group containing 1–3 carbon atoms, said alkylene being optionally substituted by a hydroxyl group, and Z is a carboxylic, sulfo or phosphono group, or an amino group of the formula

or a quaternized amino group of the formula

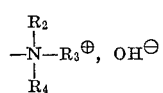

or salts thereof, wherein $R_2$, $R_3$ and $R_4$ each represent hydrogen or an optionally hydroxy-substituted lower alkyl group containing 1–4 carbon atoms, the degree of substitution corresponding to an ion exchange capacity within the limits of 0.2–1.8 milliequivalent per gram of dry substance, preferably 0.5–1.2 milliequivalent per gram of dry substance.

Such ion exchangers are previously known. A possible starting material for use when preparing these ion exchangers is so-called fibre cellulose, which is then substituted by ion-exchanging groups. An example of a suitable agent for the introduction of these groups is triethanolamine, which is attached to the cellulose by means of epichlorohydrin (ECTEOLA-cellulose). In accordance with another method of preparing ion exchangers on the basis of cellulose, fibre cellulose is treated with a substance of the formula $XR_1Z$, wherein X is a halogen, preferably chlorine or bromine, and $R_1$ and Z have each the above given significance, for the introduction of groups of the formula $R_1Z$ while splitting off the corresponding hydrogen halide which is neutralized by an alkaline substance such as sodium hydroxide. Thus, if the substance of the formula $XR_1Z$ is diethylaminoethylchloride the fibre cellulose is substituted with diethylaminoethyl groups (DEAE-cellulose). It is also known in the preparation of ion exchangers to use so-called microcrystalline cellulose as the cellulose starting material. Such cellulose may be obtained by removing, by means of different treatment methods, e.g. using diluted acids, the amorphorus parts in the cellulose so that only the crystalline parts remain. All of the aforementioned types of cellulose ion exchangers have the common disadvantage of not presenting a sufficient protein capacity. One important requirement placed on such ion exchangers, which to a very high degree are used for chromatographic operations, is that they should have the aforementioned high capacity. It can also be mentioned with regard to ion exchangers on the basis of fibre cellulose that when in the form of a bed or column they present the disadvantage of low separating ability for substance mixtures while ion exchangers on the basis of microcrystalline cellulose when in the form of a bed or column afford too low a flow rate for a liquid flowing through the bed.

It has now proved possible essentially to reduce or avoid the disadvantages set forth above, and thus to combine within one cellulose product the advantage of high protein capacity with excellent flow properties and an excellent separating ability of a bed made thereof. In accordance with the invention, this advantage is obtained if as a cellulose basic material in the ion exchangers described in the preamble of the description there is chosen a regenerated cellulose in the form of rounded particles, the particles containing 2–25% of cellulose, calculated as unsubstituted product in weight per volume, and presenting pores substantially within the range of from 2 to 2,000 mµ.

Such as unsubstituted cellulose product is previously known from patent application 775,185. It is also known to use such a product in granular form as a separating medium in so-called gel filtration, that is a process of separation based on the ability of different substances to pass through a gel bed at different speeds according to their molecular sizes. It has been shown in this connection that particles of this cellulose product in the form of a bed or column afford a relatively satisfactory liquid flow. The fact that ion exchangers of the type described in the preamble of the description on the basis of regenerated cellulose having the given properties would also obtain excellent flow properties is not very surprising in view of the prior art. Ion exchangers similar to those of the present invention are also known in which a copolymer of dextran with epichlorohydrin (cross-linked dextran) having such a degree of cross-linking that the water regain is 1–50 g./g. of dry substance serve as a carrier for the ion exchanging groups. As such ion exchangers present a relatively high porosity they will automatically also obtain a relatively high protein capacity. The fact that similar ion exchangers according to the invention, said ion exchangers also presenting a relatively high porosity, have a high protein capacity is, therefore, not very surprising either. However, it is known with regard to ion exchangers on the basis of cross-linked dextran that if a relatively high porosity is to be reached in order to obtain a high protein capacity, such high water regain values must be selected that very poor flow properties are imparted to the products. Furthermore, this ion exchanger has the serious disadvantage that the ion exchanger grain when swelling in an aqueous liquid obtains a volume which is strongly dependent on the composition and ionic strength of the aqueous liquid. This disadvantage increases with increasing water regain ability. It has now surprisingly been found that with regard to flow properties and stability against changes of the composition of the aqueous liquid the present ion exchangers differ entirely from the ion exchangers on the basis of cross-linked dextran since they do not substantially change their volume upon changes in the composition of the aqueous liquid despite their high porosity. When viewed against what is known with regard to cellulose ion exchangers and ion exchangers on the basis of cross-linked dextran it must be considered surprising that the present ion exchanger on the basis of cellulose having the aforementioned physical properties presents the combination of advantageous properties as given above, namely satisfactory flow properties, high stability against changes of composition and ionic strength high protein capacity and satisfactory separation ability. The present ion exchanger is therefore superior to the ion exchanger on the basis of fibre cellulose with regard to separating ability and protein capacity. They are superior to ion exchangers on the basis of microcrystalline cellulose with regard to flow properties and protein capacity and superior to ion exchangers on the basis of cross-linked dextran with regard to flow properties and stability against changes in the aqueous liquid surrounding the grains.

On the basis of the aforegoing the present invention relates to a process of preparing the aforementioned ion exchangers, which process is characterized in that the cellulose substituted by groups of the formula —$R_1Z$ is dissolved in an alkaline reacting liquid to a concentration of 1–15%, preferably 3–10%, calculated in weight per volume, and the obtained solution is emulsified to droplet form in a water-immiscible solvent and that the obtained emulsion is contacted with an acid reacting substance or a substance capable of forming an acid reacting substance in contact with the emulsion in a quantity sufficient to neutralize the alkaline reacting liquid, so that the substituted cellulose is precipitated in the form of round grains of essentially the same size as the droplets.

In order to transform the cellulose into a form whereby it becomes soluble in an alkaline reacting medium it is reacted with a substance having the formula $$XR_1Z$$

wherein $R_1$ and Z each have the aforementioned significance and X is halogen, a sulphate ester group or a sulphonic acid ester group, or an oxygen atom which is linked with a carbon atom in the alkylene chain to form an oxyrane group to the intended degree of substitution. The resulting substituted cellulose, soluble in alkaline liquids, is the one which is then dissolved and emulsified. Mercerized cellulose is an example of a cellulose suitable for reaction with the substance having the formula $XR_1Z$.

The process of the invention is advantageous since it also utilizes the ion-exchanging groups in the finished products as solubilizing groups in the cellulose for transforming same to the form characteristic of the present invention.

The grains according to the present invention preferably have a grain size essentially between the limits 0.01 and 1 mm.

Particular examples of radicals $R_1$ in the above formula are methylene, ethylene, propylene and 2-hydroxypropylene. Radicals $R_2$, $R_3$ and $R_4$ are especially hydrogen, methyl, ethyl, 2-hydroxyethyl, propyl, 2-hydroxypropyl, butyl or 2-hydroxybutyl.

According to the invention, the cellulose can be cross-linked in order to increase the rigidity of the particles. As an agent to effect the cross-linking reaction may be used divinyl benzene or compounds of the general Formula X'—R—Y, wherein R is an aliphatic residue, containing 3–10 carbon atoms, and X' and Y each are a halogen atom or an epoxy group forming an oxyrane group together with two adjacent atoms of the residue R. The reaction is preferably carried out in alkaline medium. Examples of suitable bifunctional organic substances useful for the cross-linking reaction are epichlorohydrin, dichlorohydrin, 1,2-3,4-diethpoxybutane, bis-epoxy-propyl ether, ethylene glycol-bis-epoxy propyl ether and 1,4-butandiol-bisepoxypropyl ether, and closely related compounds.

The aliphatic chains forming the cross-linking bridges of the cross-linked cellulose are accordingly substituted, preferably with hydroxy groups, and/or interrupted by other atoms, preferably oxygen atoms.

The cross-linking may be performed in the emulsion before the reprecipitation of the cellulose or after said reprecipitation.

The invention is further illustrated by the following specific examples.

EXAMPLE 1

(A) 60 g. of cellulose (type "Avicel" from American Viscose Corp., U.S.A. having a degree of polymerization of 342) were slurried in a vessel provided with a strong agitator in 600 ml. of toluene and 600 mg. of benzethonium chloride. 25 g. of sodium hydroxide and 600 mg. of sodium boron hydride dissolved in 82 ml. of water (mercerizing medium) were then added to the vessel, whereupon the temperature was raised to 50° C. and 35 g. of diethylaminoethyl chloride hydrochloride were added in small portions for a period of one hour. The components were then reacted for 16 hours at 50° C.

Subsequent to decanting of toluene, the substituted cellulose was slurried in a 50% solution of ethanol in water and neutralized with 37 ml. of concentrated hydrochloric acid. After the cellulose had sedimented, the above mentioned solution was decanted and the cellulose washed once in a 50% solution of ethanol and then copiously with water whereupon the water content of the substituted cellulose was adjusted so that a total weight of 500 g. of products was obtained, which was finally dissolved in 500 g. of 20% w./w. (weight by weight) sodium hydroxide.

(B) 250 ml. of the above mentioned solution of substituted cellulose was diluted with 50 ml. of 20% w./w. solution of sodium hydroxide, whereafter the cellulose solution was emulsified in 300 ml. of ethylene dichloride and 7 g. of cellulose acetate-butyrate by means of an anchor agitator at 200 r.p.m. After about 10 minutes the substituted cellulose was precipitated in the form of macroporous pearls by adding 72 g. of concentrated acetic acid in the form of a thin jet.

The pearls were then washed first four times with acetone and then once with water, whereafter they were slurried in water and the suspension acidified with hydrochloric acid to a pH of 1. The product was finally washed repeatedly with water to pH=4–5.

The resulting product was pearls of substituted cellulose having a size essentially lying between 0.025 and 0.100 mm. The pearls contained 14 g. of cellulose per decilitre and the pore size was such that dextran having a molecular weight of up to approximately $2.10^6$ was able to penetrate the pearls. The ion exchanging capacity of the product was 1.1 mequiv. per g. of dry weight. Other properties of the product are evident from the enclosed table.

EXAMPLE 2

(A) In a similar manner to that described in Example 1(A), there was first prepared a solution of substituted cellulose from a cellulose having a degree of polymerization of 220 (of the type "Avicel" from American Viscose Corp., U.S.A.) with the difference that the quantity of toluene was in this instance 500 ml.

(B) 300 ml. of the aforementioned solution of substituted cellulose was emulsified in 300 ml. of ethylenedichloride and 6 g. of cellulose acetate butyrate, by means of an anchor agitator rotating at 200 r.p.m. After about 10 minutes, the substituted cellulose was precipitated in the form of pearls by adding 56 g. of formic acid in the form of a thin jet.

The pearls were then worked up in the same manner as the pearls in Example 1(B).

The resulting product was substituted cellulose in the form of macroporous pearls having a size essentially in the range of from 0.056 to 0.250 mm. The pearls contained 13 g. of cellulose per decilitre and the pore size was such that dextran having a molecular weight of up to about $3.10^5$ was able to penetrate the pearls. The ion exchanging capacity of the products was 0.8 mequiv. per g. of dry weight. Other properties of the product are evident from the enclosed table.

EXAMPLE 3

(A) 240 g. of cellulose (type "Avicel" from American Viscose Corp., U.S.A.) having a degree of polymerization of 220 were slurried in a vessel provided with a strong agitator in 1600 ml. of toluene and 2.4 g. of benzethonium chloride. 100 g. of sodium hydroxide and 2.4 g. of sodium boron hydride dissolved in 326 ml. of water were added. After 1 hour of mercerizing the temperature was raised to 50° C. and 120 g. of diethylaminoethylchloride hydrochloride were added for a period of 30 minutes. The components were then reacted for 16 hours at 50° C.

Then the substituted cellulose was worked up as in Example 1(A), the quantities, however, being adapted to the greater quantity of starting material and the solution of cellulose prepared was 10% (by weight) based on sodium hydroxide and 9% (by weight) based on the cellulose primarily charged.

(B) 500 g. of the solution of substituted cellulose mentioned above were emulsified in 500 ml. of ethylene dichloride and 18 g. of cellulose acetate butyrate by means of an anchor agitator at 200 r.p.m. After about 10 minutes the substituted cellulose was precipitated in the form of pearls by adding 120 g. of concentrated acetic acid in the form of a thin jet.

The pearls were then worked up in the same manner as the pearls of Example 1(B).

The resulting product was substituted cellulose in the form of macroporous pearls having a size essentially lying between 0.040 and 0.250 mm. The pearls contained 15.6 g. of cellulose per decilitre and the pore size was such that dextran having a molecular weight of up to approximately $10^5$ was able to pentrate the pearls. The ion exchanging capacity of the product was 1.1 mequiv. per g. of dry weight. Other properties of the product are evident from the enclosed table.

EXAMPLE 4

(A) 120 g. of cellulose (type "Avicel" from American Viscose Corp., U.S.A.), having a degree of polymerization of 220) was slurried in a vessel provided with a strong agitator in 1,000 ml. of toluene and 1.2 g. of benzethonium chloride. 55 g. of diethylaminoethyl chloride, hydrochloride dissolved in 110 ml. of water were then added to the vessel and the mixture was stirred for 40 minutes. Then 40 g. of sodium hydroxide and 1.2 g. of sodium boron hydride dissolved in 53 ml. of water were added over a period of ½ hour, whereafter the reaction was continued for 16 hours at 50° C.

The substituted cellulose was then worked up in the same manner as the pearls in Example 1(A).

(B) 150 ml. of the aforementioned solution of substituted cellulose were emulsied in 200 ml. of toluene and 4 g. of Chremophor EL (reaction product between castor oil fatty acids and ethylene oxide from Badische Anilin- und Sodafabrik, Federal Republic of Germany) by means of a turbine agitator rotating at 700 r.p.m. After about 10 minutes, the substituted cellulose was precipitated out in the form of pearls by adding 30 g. of ethyl acetate for a period of 30 minutes, whereafter the precipitation was completed by adding 9 g. of concentrated acetic acid.

The pearls were then washed three times with water, whereafter they were slurried in water and the suspension acidified to pH=1 with concentrated hydrochloric acid. Finally, the product was washed repeatedly with water to pH=4–5.

The resulting product was substituted cellulose in the form of macroporous pearls having sizes essentially in the range of from 0.056 to 0.250 mm. The pearls contained 13 g. of cellulose per decilitre and the size of the pores thereof were such that dextran having a molecular weight up to about $1.10^7$ was able to penetrate the pearls. The ion exchanging capacity of the product was 0.8 mequiv. per g. of dry weight. Other properties of the product are evident from the enclosed table.

EXAMPLE 5

(A) 60 grams of cellulose (type "Avicel" from American Viscose Corp., U.S.A., having a degree of polymerization of 220) were slurried in a vessel provided with a strong agitator in 500 ml. of toluene and 600 mg. of benzethonium chloride. 25 g. of sodium hydroxide and 600 mg. of sodium boron hydride dissolved in 82 ml. of water (mercerizing medium) were then added to the vessel, whereafter the temperature was slowly raised to 50° C. and 25 g. of diethylaminoethyl chloride, hydrochloride were added in small portions over a period of 1 hour. The components were then reacted for 16 hours at 50° C.

The reaction mixture was cooled to 45° C. and the pH adjusted with concentrated hydrochloric acid to pH=5.5–6, whereafter 48 ml. of propyleneoxide were added dropwise. The reaction was then continued for 16 hours at 45° C., whereafter the substituted cellulose was worked up and dissolved in the same manner as the reacted cellulose in Example 1(A).

(B) 300 ml. of the aforementioned solution of substituted cellulose were emulsified and precipitated thereafter in the same manner as described in Example 2(B), although with the difference that the precipitating agent was in this instance 72 g. of concentrated acetic acid.

The pearls were then worked up in the same manner as the pearls in Example 1(B).

The resulting product was substituted cellulose in the form of macroporous pearls having a size essentially in the range of from 0.056 to 0.315 mm. The pearls contained 15 g. of cellulose per decilitre and the size of the pores thereof was such that dextran having a molecular weight of up to about $5.10^5$ was able to penetrate the pearls. The ion exchanging capacity of the product was 1.1 mequiv. per g. of dry weight and the degree of quaternization 83%. Other properties of the product are evident from the enclosed table.

EXAMPLE 6

(A) 60 g. of cellulose (type "Avicel" from American Viscose Corp., U.S.A., having a degree of polymerization of 220) were slurried in a vessel provided with a strong agitator in 400 ml. of toluene and 600 mg. of benzethonium chloride. 25 g. of sodium hydroxide and 600 mg. of sodium boron hydride dissolved in 82 ml. of water were then added to the vessel, whereafter the temperature was slowly raised (over a period of approximately 90 minutes) to 70° C., whereafter 15 g. of sodium chloroacetate were added in small portions. The components were then reacted at 70° C. for 4 hours.

The substituted cellulose was then worked up in the same manner as that described in Example 1(A).

(B) 300 ml. of the aforementioned solution of substituted cellulose were emulsified and precipitated thereafter in the same manner as that described in Example 5(B).

The pearls were then worked up in the same manner as the pearls in Example 1(B).

The resulting product was substituted cellulose in the form of macroporous pearls having a size essentially in the range of from 0.056 to 0.315 mm. The pearls contained 8.5 g. of cellulose per decilitre and had a pore size which permitted dextran having a molecular weight of up to about $10^7$ to penetrate the pearls. The ion exchanging capacity of the product was 0.7 mequiv./g. Other properties of the products are evident from the enclosed table.

EXAMPLE 7

(A) 120 g. of cellulose (type "Avicel" from American Viscose Corp., U.S.A. having a degree of polymerization of 220) were slurried in a vessel provided with a strong agitator in 800 ml. of toluene and 1.2 g. of benzethonium chloride. Then 200 g. of 85% chloromethyl phosphonic acid were added and the mixture was stirred for 20 minutes, whereafter 144 g. of sodium hydroxide and 1.2 g. of sodium boron hydride dissolved in 144 ml. of water were added from a dropping funnel over a period of one hour, whereafter the temperature was raised to 90° C. and the components reacted for 16 hours.

Then the substituted cellulose was worked up as in Example 3(A), the solution of cellulose prepared, however, being made 10% (by weight) also based on the cellulose primarily charged.

(B) 400 g. of the solution of cellulose mentioned above were diluted with 100 g. of a 10% solution of sodium hydroxide, whereafter emulsification and precipitation was carried out as in Example 3(B), but the quantity of cellulose acetate butyrate was 15 g.

The pearls were then first washed five times with acetone and then once with water, whereafter they were treated with 0.5 M sodium hydroxide. Finally, the product was washed with distilled water to neutral reaction.

The product obtained was substituted cellulose in the form of pearls having a size essentially in the range of 0.040 to 0.250 mm. The pearls contained 12 g. of cellulose per decilitre and the size of the pores thereof was such that dextran having a molecular weight of up to about $10^6$ was able to penetrate the pearls. The ion exchanging capacity of the product was 0.8 mequiv. per g. of dry weight. The flow as defined below was 60 cm./h.

EXAMPLE 8

500 g. of a solution of cellulose according to Example 3(A) were emulsified in 550 ml. of ethylene dichloride and 15 g. of cellulose acetate butyrate by means of an anchor agitator at 200 r.p.m. After 10 minutes the substituted cellulose was precipitated in the form of macroporous pearls by adding 55 g. of concentrated acetic acid. After 30 minutes the temperature was raised over a period of half an hour to 50° C. and 30 g. of epichlorohydrin were added. After one hour 30 g. of concentrated acetic acid were added. Another 30 minutes later the gel was slurried repeatedly with acetone. Then the gel was treated with a mixture of equal parts of 1 M sodium hydroxide and ethanol, whereafter washing in dilute ethanol and finally with water followed.

The product obtained was substituted cellulose in the form of pearls having a size essentially in the range of from 0.040 to 0.250 mm. The pearls contained 18 g. of dry substance per decilitre and the size of the pores thereof was such that dextran having a molecular weight of up to about $4.10^4$ was able to penetrate the pearls. The ion exchanging capacity of the product was 0.95 mequiv. per g. of dry substance. Other properties of the product are evident from the enclosed table.

EXAMPLE 9

550 ml. of settled gel, prepared according to Example 3 and containing 45 g. of dry substance, were filtered by suction and then slurried twice in 0.5 M sodium hydroxide. After filtering by suction the pearls soaked with alkali were slurried in 500 ml. of toluene wherein 5 g. of benzethonium chloride were dissolved. The temperature was raised to 50° C. and after 30 minutes 60 g. of epichlorohydrin were added. After another 30 minutes 30 g. of concentrated acetic acid were added, whereafter the product was slurried in dilute ethanol and then washed with water.

The product obtained was substituted cellulose in the form of pearls having a size essentially in the range of 0.040 to 0.250 mm. The pearls contained 18 g. of dry substance per decilitre and the size of the pores was such that dextran having a molecular weight of up to about $4.10^4$ was able to penetrate the pearls. The ion exchanging capacity of the product was 0.95 mequiv. per g. of dry weight. Other properties are evident from the enclosed table.

EXAMPLE 10

60 g. of cellulose (being of the same type as that used in Example 4) were slurried in a vessel provided with a strong agitator in 400 ml. of toluene and 0.6 g. of benzethonium chloride. Then 17.5 g. of propanesultone were added, whereafter the mixture was stirred for 20 minutes, when 20 g. of sodium hydroxide and 0.6 g. of sodium boron hydride dissolved in 82 ml. of water were added in small shares over a period of 30 minutes. The components were then reacted for 4 hours at room temperature.

Then the substituted cellulose was worked up as in Example 7(A).

400 g. of the solution of cellulose thus obtained were diluted with 100 g. of a 10% solution of sodium hydroxide, whereafter the solution of cellulose was emulsified and precipitated in the same manner as in Example 8(A) and the pearls of cellulose obtained were also crosslinked and worked up in the same manner as in Example 8(A).

The resulting product was substituted cellulose in the form of pearls having a size essentially in the range of from 0.040 to 0.250 mm. The pearls contained 13 g. of dry substance per decilitre and the size of the pores thereof was such that dextran having a molecular weight of up to about $8.10^5$ was able to penetrate the pearls. The ion exchanging capacity of the product was 0.75 mequiv. per g. of dry substance. The protein capacity and the flow as defined below were 3000 mg. of hemoglobin per mequiv. and 120 cm./h., respectively.

The following tests were made to establish the properties of the obtained products.

(1) Flow

The maximum flow of a packed bed having a diameter of 5 cm. and a height of 10 cm. was estimated. In the case of products consisting of round grains the experimentally estimated flow was recalculated to a standardized average grain size of 0.100 mm. it being known that the flow in such cases is directly proportional to the square of the average grain size.

3,634,394

(2) Protein capacity

The ion exchangers were packed into a bed having a diameter of 1.5 cm. and a height of approximately 3 cm. and were equilibrated with a buffer. The buffer used for anionic exchangers was 0.05 molar tris-(hydroxymethyl)-aminomethane (Tris), the pH of which was adjusted to 8.0 with hydrochloric acid, and for cationic exchangers an acetate buffer was used having an ionic strength of 0.01 and pH 5.0. A solution of bovine carbonmonoxy-hemoglobin produced in accordance with Prinz (J. Chromatog. 2 (1959) 445) was diluted to a ratio of 1:25 in the respective buffer and allowed to run through the bed until the concentration of the charged solution was the same as that of the discharged one. The bed was then washed clean from surplus protein with respective buffers. Adsorbed protein was then eluted, in the case of anionic exchangers with 0.10 molar Tris, the pH of which was adjusted to 7.2 with hydrochloric acid also containing 1.0 molar sodium chloride, and in the case of cationic exchangers with an acetate buffer of the ionic strength 0.1 and pH 5.0 to which 1 molar sodium chloride had been added. The quantity of protein eluted was determined spectrophotometrically and the quantity of ion exchanger was determined by drying the bed after all salts and possible remaining protein had been washed away.

(3) Separating ability and stability against changes in ion strength

The ion exchangers were packed to form a bed having a diameter of 1.5 cm. and a height of approximately 10 cm. and were equilibrated with a buffer. The buffer used in case of anionic exchangers was 0.1 molar Tris-hydrochloride having a pH 8.3, and in the case of cationic exchangers an acetate buffer having pH 5.0 and ionic strength 0.1 was used. 2 ml. of a solution of hemoglobin prepared in the aforedescribed manner and diluted to a ratio of 1:10 with the respective buffer were then added to the bed. A conventional type gradient vessel comprising two cylindrical chambers was used, one of which chambers was filled with respective buffer and the other with respective buffer to which 1.0 molar sodium chloride had been added. The bed was eluted by pumping a liquid at a rate of approximately 0.2 ml./min. form the gradient vessel. The protein concentration in the eluate was registered spectrophotometrically on a recording diagram and the ionic strength in the eluate was determined by chloride titration in removed fractions. The separation ability was assessed from the diagram. The bed height was established upon completion of the test, when the ionic strength in the eluate was approximately 0.4. Shrinkage of the bed upon change in ionic strength was estimated from this data.

| Product | Type | Ion exchanger group | Flow, cm./h. | Protein capacity (reversible CO-hemoglobin adsorption) mg. per mequiv. of ionic capacity | Separation ability | Shrinkage, percent |
|---|---|---|---|---|---|---|
| Whatman DE: | | | | | | |
| 23 | Fibre | DEAE | 1,300 | 340 | Not good | 0 |
| 52 | Micro-crystalline | DEAE | 50 | 480 | Very good | 5 |
| DEAE-Sephadex A-50 | Cross-linked dextran | DEAE | 10 | 1,380 | do | 35 |
| Example: | | | | | | |
| 1 | Present invention | DEAE | 125 | 1,200 | do | 7 |
| 2 | do | DEAE | 80 | 1,300 | Good | 0 |
| 3 | do | DEAE | 90 | 1,300 | Very good | 0 |
| 4 | do | DEAE | 80 | 1,100 | do | 0 |
| 5 | do | $R_2 = R_3 =$ ethyl, $R_4 =$ 2-hydroxy-propyl. | 70 | 920 | do | 0 |
| 6 | do | Carboxymethyl | 100 | 2,140 | Good | 2 |
| 8 | do | DEAE | 200 | 1,300 | Very good | 0 |
| 9 | do | DEAE | 155 | 1,300 | do | 0 |

NOTE.—Given as $100 - \frac{\text{Final bed volume, ml.}}{\text{Bed volume at start, ml.}} \cdot 100$

What I claim is:

1. A method for the preparation of ion exchangers consisting of round grains of cellulose substituted by groups of the formula —$R_1Z$, wherein $R_1$ is a lower alkylene group containing 1–3 carbon atoms, said alkylene being unsubstituted or substituted by a hydroxyl group, and Z is a carboxylic, sulfo or phosphono group or salts thereof or an amino group of the formula

or a quaternized amino group of the formula

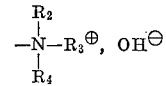

or salts thereof, wherein $R_2$, $R_3$ and $R_4$ each represent hydrogen or an unsubstituted or hydroxy-substituted lower alkyl group containing 1–4 carbon atoms, which method comprises reacting cellulose with a substance having the formula $XR_1Z$, wherein $R_1$ and Z each have the aforementioned significance and X is halogen, a sulphate ester group or a sulphonic acid ester group, or an oxygen atom, which is linked with a carbon atom in the alkylene chain to form an oxyrane group, to a degree of substitution corresponding to an ion exchange capacity in the range of from 0.2 to 1.8 milliequivalents per gram of dry substance, whereafter the substituted cellulose is dissolved in an alkaline medium to a concentration of 1–15% calculated in weight per volume, and the resulting solution is emulsified to droplet form in a water-immiscible solvent, and the obtained emulsion is contacted with an acid reacting substance or a substance capable of forming an acid reacting substance in contact with the emulsion, in a quantity sufficient to neutralize the alkaline medium to precipitate the cellulose in the form of round pore grains of essentially the same size as the droplets, said grain containing 2–25% of cellulose calculated as unsubstituted product in weight per volume and having pores essentially lying in the range of from 2 to 2000 m$\mu$.

2. A method as claimed in claim 1, wherein the cellulose is treated with a cross-linking agent to increase the rigidity of the particles.

References Cited

FOREIGN PATENTS 936,039    9/1963    Great Britain.

MELVIN GOLDSTEIN, Primary Examiner

U.S. Cl. X.R.

260—2.1 R, 2.2 R, 231 A